United States Patent [19]

Jaeggi

[11] 4,218,487

[45] Aug. 19, 1980

[54] PROCESSES FOR PREPARING FLAVORING COMPOSITIONS

[75] Inventor: Kurt Jaeggi, Greifensee, Switzerland

[73] Assignee: Givaudan Corporation, Clifton, N.J.

[21] Appl. No.: 908,599

[22] Filed: May 23, 1978

[30] Foreign Application Priority Data

May 31, 1977 [LU] Luxembourg ............................ 77456
Apr. 7, 1978 [CH] Switzerland .......................... 3771/78

[51] Int. Cl.$^2$ ........................ A23L 1/226; A23L 1/231
[52] U.S. Cl. .................................... 426/533; 426/652; 426/653; 426/589
[58] Field of Search ............... 426/533, 652, 653, 589, 426/650

[56] References Cited

U.S. PATENT DOCUMENTS

| | | | |
|---|---|---|---|
| 3,336,140 | 8/1967 | Dirks et al. ........................... | 426/533 |
| 3,365,306 | 1/1968 | Perret .................................. | 426/533 |
| 3,478,015 | 11/1969 | Onishi et al. ........................ | 426/533 |
| 3,761,287 | 9/1973 | Jaeggi ................................. | 426/533 |
| 4,022,920 | 5/1977 | Doornbos et al. .................... | 426/533 |
| 4,081,565 | 3/1978 | Chhuy et al. ........................ | 426/533 |

OTHER PUBLICATIONS

Mills et al., *J. Agr. Food Chem.*, 17(4), 723-727, (1969).
Hodge et al., *JACS*, 75, (1953), pp. 316-322.
Hodge et al., American Soc. of Brewing Chemists Proceedings Annual Meeting, (1963), pp. 84-92.

*Primary Examiner*—Esther M. Kepplinger
*Attorney, Agent, or Firm*—Thomas Cifelli, Jr.; Robert F. Tavares

[57] ABSTRACT

Synthetic flavorants are made by heating a mixture of an amino sugar, an amino acid or a pyrolytic degradation product thereof, and a polyalcohol and/or water.

9 Claims, No Drawings

PROCESSES FOR PREPARING FLAVORING COMPOSITIONS

FIELD OF THE INVENTION

This invention relates to the field of flavorants.

SUMMARY OF THE INVENTION

This invention relates to the flavorants noted under "Abstract of the Invention", as well as to the process for preparing said flavorants and the use of said flavorants in making flavoring compositions and edible materials (e.g. foods) flavored with said flavorants.

DESCRIPTION OF THE PREFERRED EMBODIMENTS

The process provided by the present invention for the manufacture of synthetic flavorants comprises heating a mixture containing an amino sugar, an amino acid or a pyrolytic degradtion product thereof and a polyalcohol and/or water.

The term "amino sugar" used herein means, in particular, a monosaccharide or disaccharide in which the alcoholic hydroxyl group in the 1- or 2-position has been replaced by an amino group (as hereinafter defined).

The aforementioned sugars are especially dextrorotatory sugars.

The corresponding monosaccharides can be aldoses such as aldopentoses or aldohexoses (e.g. ribose, arabinose, xylose, glucose, mannose, galactose etc.) as well as ketoses (e.g. fructoses).

Especially suitable disaccharides are lactose, maltose or cellobiose.

The term "amino" used herein relates to the amino groups $-NH_2$, $-NHR_1$ and $-NR_1R_2$ in which $R_1$ and $R_2$ each represent a lower alkyl group (e.g. a $C_{1-6}$-alkyl group), $R_1$ and $R_2$ together with the nitrogen atom to which they are attached form a 5-membered or 6-membered heterocyclic ring. This heterocyclic ring can contain 1, 2 or 3 hetero atoms. Examples of such rings are piperidino, pyrrolidino, piperazino, morpholino etc. The lower alkyl groups can be substituted, especially terminally substituted, by hydroxy, mercapto, alkylmercapto or an ether group, for example, a lower alkoxy (e.g. a $C_{1-6}$-alkoxy) group. Examples of lower alkyl groups or the alkyl moieties of lower alkoxy groups are methyl, ethyl, propyl, butyl, hexyl etc.

Examples of amino sugars are, accordingly, 1-amino derivatives of glucose, xylose, fructose, lactose and maltose, 1-methylamino derivatives of glucose, xylose and lactose, 1-ethylamino derivatives of glucose, 1-propyl derivatives of glucose, xylose and lactose, 1-butylamino derivatives of glucose, 1-hexylamino derivatives of glucose and xylose, 1-(2-mercaptoethyl)amino derivatives of glucose, xylose, fructose and lactose, 1-(2-hydroxyethyl)amino derivatives of glucose, xylose, lactose and maltose, 1-pyrrolidino derivatives of glucose, xylose, fructose, lactose and maltose, 1-piperazino derivatives of glucose, 2-amino derivatives of glucose, xylose, ribose and galactose etc., with 2-amino derivatives of glucose being preferred.

The amino sugar can be used as such or in the form of a salt which forms the free amino sugar under the reaction conditions. In place of the aforementioned sugars there can be used, for example, a hydrohalide, especially the hydrochlorides.

Especially suitable amino sugars have been shown to be 1-amino derivatives of glucose, xylose, fructose, lactose and maltose and 2-amino derivatives of glucose as well as their hydrochlorides.

The amount of amino sugar in the mixture conveniently approximately 5 wt.% to 50 wt.%.

Preferred amino acids are cysteine, methionine and glycine.

The amino acids can be used as such or in the form of derivatives or salts which form the free amino acids under the reaction conditions. In place of cysteine there can be used, for example, cysteine hydrochloride. In addition to, or in place of, cysteine, methionine and glycine the mixture can contain other amino acids; for example, small amounts of the amino acids which are known to occur in meat or milk, peptides or related compounds such as, for example, alanine, arginine, cystine, histidine, isoleucine, leucine, lysine, serine, threonine, valine, anserine, carnosine or taurine. In this case, there can also be used meat proteolysates or milk proteolysates (see, for example, DOS No. 2 362 998).

Examples of pyrolytic degradation products of amino acids which can be used are cysteamine (ex cysteine), methional (ex methionine).

The amount of amino acids in the mixture conveniently amounts to 1.5 wt.% to 45 wt.%, preferably 2 wt.% to 40 wt.%. Where less than 1 wt.% of amino acids is present, a strong flavour does not result, but rather an atypical flavour.

According to an especially preferred embodiment of the process provided by the present invention, L-cysteine is used as the main component of the three amino acids named earlier.

As polyalcohols there can be used, for example, trivalent alcohols such as glycerine or glycols such as, for example, propylene glycol. The polyalcohol can be present in the mixture in an amount of ca 0.5 wt.% to 95 wt.%, preferably 30 wt.% to 75 wt.%, and the water can be present in the mixture in an amount of from 0.001 wt.% to 98 wt.%, preferably 3 wt.% to 20 wt.%.

In a preferred embodiment of the process provided by the present invention, the starting materials are heated in the presence of a sulphur-containing compound.

As sulphur-containing compounds there can be used, for example,

Hydrogen sulphide, alkali metal or alkaline earth metal sulphides or hydrogen sulphides (e.g. sodium sulphide, potassium sulphide, calcium sulphide, sodium hydrogen sulphide or potassium hydrogen sulphide), ammonium sulphide, ammonium hydrogen sulphide, mercaptans such as lower alkylmercaptans, especially $C_{1-3}$-alkylmercaptans (e.g. methylmercaptan or ethylmercaptan), lower alkylthio ethers, especially $C_{1-3}$-alkylthio ethers (e.g. dimethylsulphide or diethylsulphide), lower alkyldisulphides or lower alkyltrisulphides (e.g. dimethyl disulphide, diethyldisulphide or dimethyltrisulphide) the aforementioned sulphur-containing amino acids (namely cysteine, cystine, methionine, glutathione etc.), the aforementioned sulphur-containing amino sugars, thioacetic acid, furfurylmercaptan, 2-mercapto-ethanol, cysteamine, thiamine, methiazole etc.

Preferred sulphur-compounds are sodium sulphide, 2-mercaptoethanol, cysteamine, furfurylmercaptan and thioacetic acid.

Suitable ratios of the main components of the mixtures used for the manufacture of the synthetic flavourants in accordance with the present invention are given hereinafter:

| Ingredient | Weight percent |
|---|---|
| Amino sugar | 0.5-75% |
| Amino acid | 1.5-45% |
| Polyalcohol or water | 0.5-95% |
| Content of sulphur | 0.005-15% |

The desired synthetic flavourants generally form when the mixture used as the starting material is heated at temperatures which are customary in the case of the known, non-enzymatic browning reaction [Maillard reaction; see, for example, Food Res., 25, (1960), 491–594], namely for example to temperatures of 50°-180° C., in particular to about 110°-150° C. The heating time is normally inversely proportional to the temperature; it conveniently amounts to about 10 minutes to 2 hours.

Besides the aforementioned main components there can, as mentioned, also be present in the mixture still other ingredients such as flavour-enhancers [e.g. 0.1-200% monosodium glutamate, 0.1-100% disodium inosine-5'-monophosphate (IMP) and disodium guanosine-5'-phosphate (GMP)], autolysates or hydrolysates (HVP) of vegetable or animal proteins, fats, such as animal fats (e.g. lard, beef tallow, poultry fat, mutton fat or milk fat), vegetable fats [e.g. peanut oil, coconut oil, rape oil, sunflower oil, olive oil, vegetable oil 1400 ® (triglycerides having short fatty acid esters), Miglyol 812 ® (triglycerides having short fatty acid esters)], special flavouring substances (e.g. 0.1-100% butter or synthetic butter substitute), amines (e.g. pyrrolidine, piperazine etc.), ammonium chloride, ribonucleotides (mixtures of guanosyl monophosphate and inosine monophosphate) etc.

The synthetic flavourants manufactured in accordance with the present invention are highly concentrated synthetic flavourants which can be diluted or distributed in edible materials in a manner known per se, preferably together with other flavour-imparting ingredients. They can be converted according to methods known per se into the usual forms of use such as solutions, pastes or powders. They can be spray-dried, dried in a fluidised-bed, vacuum-dried, lyophilised or adsorbed. As carrier materials there can be used, for example, maltodextrins, gum arabic, tragacanth, salts, brewers' yeast, alginates, carrageen or simular adsorbents. As flavour-improvers there can be used indoles, maltol, dienals. spice oleoresins or smoke aromas. The formulation of such synthetic flavourants as well as the flavouring of foodstuffs can be carried out in a manner known per se [see J. Merory; Food flavorings, composition, manufacture and use; Avi Publ. Co., Westport 1968, or A. M. Burger; die natürlichen und künstlichen Aromen (the natural and synthetic aromas); A. Hüthing Verlag Heidelberg (1968)].

The thus-formulated products can serve for the flavouring of diverse foodstuffs.

The following Table provides data relating to suitable concentration ranges for various forms of use of the flavouring compositions provided by the present invention:

Table

| Form of use | general | preferred |
|---|---|---|
| Solutions | 1-100% | 10-60% |
| Pastes | 1-100% | 10-90% |
| Spray-dried powders | 3-60% | 15-35% |
| Lyophilised vacuum-dried powders | 2-30% | 8-18% |
| Adsorbed powders (adsorbates) | 1-75% | 10-50% |
| Dip sauces | 0.25-20% | 0.5-10% |
| Cocktail sauces | 0.05-5.0% | 0.1-3.0% |
| Meat sauces | 0.05-5.0% | 0.1-3.0% |
| Soups | 0.01-0.5% | 0.05-0.3% |
| Bouillons | 0.01-0.5% | 0.05-0.3% |
| Meat preserves | 0.05-10.0% | 0.1-3.0% |
| Ready-made dishes | 0.05-10.0% | 0.1-3.0% |
| Meat extracts | 0.05-10.0% | 0.1-3.0% |
| Spice agent (e.g. mustard, ketchup, soya sauce) | 0.05-2.0% | 0.1-1.0% |
| Snack food | 0.1-20.0% | 0.5-6.0% |
| Roast products (e.g. puffed breakfast) | 0.1-20.0% | 0.5-6.0% |
| Cereals | 0.1-20.0% | 0.5-6.0% |
| Pastries | 0.05-5.0% | 0.1-1.0% |

With regard to the flavour character, then the following applies:

When the heating is carried out in the absence of sulphur-containing compounds, or in the presence of only a small amount of sulphur-containing compounds, there are obtained synthetic flavourants having a character of baked goods, especially with a bread, nut pastry and pretzel character, and can therefore be used for the production of improvement of the flavour character of baked goods such as bread, bread rolls, milk bread, plaits, poppy breads, panettone, biscuits, waffles, small cakes, pastries etc. The products treated in this manner invariably possess a fuller, improved flavour.

In the case of modern production methods for bread (or baked goods) there exists a great need for the addition of flavour-improving substances for the following reasons. The production time must be shortened on grounds of the rational carrying out of the yeast fermentation process, baking is carried out at relatively low temperatures or at higher temperatures for a shorter time and the storage stability must be extended because of new distribution systems.

The impairment of the flavour of fresh bread (or of baked goods) which results as a consequence of these rationalisation measures can not be prevented in a decisive manner by the addition of the flavouring compositions provided by the present invention. For this purpose, such compositions can, for example, be worked into the dough before the baking process. The amount of flavouring composition used in this case conveniently lies at ca 0.1 wt.% to 5 wt.%.

When the heating is carried out in the presence of sulphur-containing compounds, there are obtained synthetic flavourants having an intensive meat character. The corresponding flavouring compositions formulated as described earlier can accordingly be used for the flavouring of diverse foods and luxury consumables (e.g. meat-like products prepared from natural or synthetic proteins, chips, soups, sauces, crackers, waffle fillings etc.).

In order to achieve an intensive meat flavour, the ratio of amino sugar to sulphur-containing compound should amount to about 4:1 to 3:1. If the ratio is higher (e.g. 8:1 to 10:1), the aroma of baked goods already predominates.

The advantages of the synthetic meat flavourants provided by the present invention are especially the following. They have more pronounced flavour properties than hitherto known meat flavourants; for example, they are about 10 times stronger than synthetic meat flavourants of the Maillard type, which is especially noticeable in a more pronounced flavour depth and as a consequence of which they can be used in very low concentrations. They can be used in oily form, in which case it is possible to flavour meat substitute substances such as soya protein uniformly. Thus, for example, soya protein can be flavoured extremely rationally by the spinning process.

The amount of synthetic flavourant manufactured in accordance with the present invention in an flavoured product can amount, for example, to approximately 0.05% to approximately 10%, preferably approximately 0.2% to 4%. Detailed data relating to this can be obtained from the foregoing Table.

The following Examples illustrate the present invention:

EXAMPLE 1

(a) An intimate mixture containing:

| | |
|---|---|
| 2-Mercaptoethyl-1-lactosylamine | 16 g |
| Crysteine hydrochloride | 3 g |
| Diacetyl | 2 g |
| Ammonium chloride | 2 g |
| Sodium sulphide | 1 g |
| Water | 5 g |
| propylene/glycol | 15 g | is heated with constant stirring to 120° C. and held at this temperature for 10 minutes. The resulting synthetic flavourant has water (0.2 g to 1 liter) there is obtained a clear soup having a pronounced meat flavour.

(b) By using 7.2 g of 1-glucosylamine in place of the 16 g of 2-mercaptoethyl-1-lactosylamine, then there is obtained a very similar synthetic flavourant having a somewhat reduced sulphurous meat note in favour of the fat note. The same effect is also achieved using 6 g of 1-xylosylamine, 7.2 g of 2-fructosylamine, 13.7 g of 1-lactosylamine, 13.7 g of 1-maltosylamine, 7.7 g of methyl-1-glucosylamine or 6.6 g of methyl-1-xylosylamine.

(c) By using 9.6 g of 2-mercaptoethyl-1-glucosylamine or 8.4 g of 2-mercaptoethyl-1-xylosylamine or 16 g of 2-mercaptoethyl-1-maltosylamine as the amino sugar in (a), then there is obtained an almost identical synthetic flavourant.

(d) By using 9.5 g of 2-hydroxyethyl-1-glucosylamine or 8 g of 2-hydroxyethyl-1-xylosylamine or 15 g of 2-hydroxyethyl-1-lactosylamine or 15 g of 2-hydroxyethyl-1-maltosylamine or 9 g of 1-pyrrolidinyl-glucosylamine or 8 g of 1-pyrrolidinyl-xylosylamine or 16 g of 1-pyrrolidinyl-lactosylamine or 16 g of 1-pyrrolidinyl-maltosylamine or 16.5 g of 1-piperidinyl-glucosylamine as the amino sugar in (a), then there is obtained a roast pork flavourant having an even more pronounced roast note than the flavourant obtained in (a).

EXAMPLE 2

(a) An intimate mixture containing:

| | |
|---|---|
| 2-Fructosylamine | 8 g |
| 1-Xylosylamine | 8 g |
| Ascorbic acid | 4 g |
| Methional [3-methylmercapto-propionaldehyde] (0.25% in alcohol) | 1 g |
| Sodium sulphide | 1 g |
| Furfurylmercaptan (10% in alcohol) | 7 g |
| Water | 5 g |
| Propylene/glycol | 15 g | is warmed to 130° C. and held at this temperature for 10 minutes. The aqueous product is spray-dried and then gives a synthetic flavourant in powder form which is very similar to the flavour of roast potato.

(b) By using 10 g of 1-methyl-glucosylamine or 9 g of 1-methyl-xylosylamine in place of 8 g of 1-xylosylamine in (a), then there is obtained a similar roast potato flavourant.

(c) By using 11.5 g of 2-hydroxyethyl-1-glucosylamine or 10 g of 2-hydroxyethyl-1-xylosylamine or 12.5 g of 1-pyrrolidinyl-glucosylamine or 11 g of 1-pyrrolidinyl-xylosylamine as the amino sugar in (a), then there is obtained a roast potato flavour having a still more pronounced roast note.

EXAMPLE 3

(a) An intimate mixture containing:

| | |
|---|---|
| 2-Mercaptoethyl-1-xylosylamine | 8 g |
| Ascorbic acid | 6 g |
| Methional (0.5% in alcohol) | 1 g |
| Glycerine | 40 g | is heated to 110° C. and held at this temperature for 15 minutes. The resulting water-soluble synthetic flavourant has a fine baked hazelnut flavour.

(a) By using 9 g of 2-mercaptoethyl-1-glucosylamine or 15 g. of 2-mercaptoethyl-1-lactosylamine or 15 g. of 2-mercaptoethyl-1-maltosylamine in place of 8 g of 2-mercaptoethyl-1-xylosylamine in (a), then there is obtained a baked hazelnut flavourant of the same flavour direction.

EXAMPLE 4

(a) An intimate mixture of:

| | |
|---|---|
| 1-Xylosylamine | 15 g |
| L-Cysteine hydrochloric | 15 g |
| Milk proteolysate | 5 g |
| Sodium glutamate | 4 g |
| Ribonucleotides | 1 g |
| Ammonium chloride | 1 g |
| Diacetyl | 1 g |
| 2-Mercaptoethanol (10% in water) | 2 g |
| Pyrrolidine | 5 g |
| Glycerine | 20 g | is heated while stirring to 120° C. and held at this temperature for 5 minutes. The resulting synthetic flavourant has a pronounced beefsteak flavour. It can therefore be used, for example, to confer the typical beefsteak flavour to purely synthetic fibrous meat substitutes in amounts of 0.2% to 4%.

(b) A synthetic flavourant of the same flavour direction can be obtained by replacing the 15 g of 1-xylosylamine by 18 g. of 1-glucosylamine or 18 g of 2-fructosylamine or 34 g of 1-lactosylamine or 34 g of 1-maltosylamine.

EXAMPLE 5

(a) An intimate mixture of;

| | |
|---|---|
| 1-Xylosylamine | 80 g |
| Cysteine hydrochloride | 80 g |
| Ascorbic acid | 60 g |
| Milk proteolysate | 50 g |
| Sodium glutamate | 20 g |
| 2-Mercaptoethanol (10% aq.) | 7 g |
| Thioacetic acid | 7 g |
| Glycerine | 500 g |
| Propylene/glycol | 500 g |
| Pyrrolidine | 35 g | is heated to 120° C. and held at this temerature for 5 minutes. The synthetic flavourant obtained has the flavour of bloody roast beefsteak.

(b) A synthetic flavourant of the same type can be obtained by replacing the 80 g of 1-xylosylamine by 96 g. of 1-glucosylamine or 96 g. of 2-fructosylamine or 182 g. of 1-lactosylamine or 182 g of 1-maltosylamine.

(c) By replacing the 80 g. of 1-xylosylamine in (a) by 120 g of 2-hydroxyethyl-1-glucosylamine or 104 g of 2-hydroxyethyl-1-xylosylamine or 206 g of 2-hydroxyethyl-1-lactosylamine or 206 g of 2-hydroxyethyl-1-maltosylamine, then there is obtained a beefsteak flavourant having a more pronounced roast note.

EXAMPLE 6

(a) An intimate mixture of:

| | |
|---|---|
| 1-Glucosylamine | 100 g |
| Glycerine | 85 g |
| Cysteamine | 25 g |
| propylene/glycol | 20 g |
| Water | 50 g | is heated to 120° C. and held at this temperature for 30 minutes. The solution is spray-dried on gum arabic or maltodextrin and provides a delicious fresh bread flavourant which can be used in an amount of ca 0.3% in the water of the bread dough. The crumb of white bread is thereby improved in an impressive manner.

(b) A bread flavourant of the same type can be obtained by replacing the 100 g of 1-glucosylamine by 83 g of 1-xylosylamine or 190 g of 1-lactosylamine or 190 g of 1-maltosylamine or 123 g of 2-hydroxyethyl-1-glucosylamine or 106 g of 2-hydroxyethyl-1-xylosylamine or 213 g of 2-hydroxyethyl-1-lactosylamine or 213 g of 2-hydroxyethyl-1-maltosylamine or 130 g of 1-pyrrolidinyl-glucosylamine or 114 g of 1-pyrrolidinyl-xylosylamine or 140 g of 1-piperidinyl-glucosylamine.

EXAMPLE 7

An intimate mixture of:

| | |
|---|---|
| D-Glucosamine hydrochloride | 20 g |
| Cysteine hydrochloride | 30 g |
| Water | 2 g |
| Glycerine | 3 g | is introduced into 50 g of warm fat (120° C.) and fried for 30 minutes. After filtration of the oil, a mixture having the same composition in the same amount and in the same fat is introduced and the mixture obtained is fried at 120° C. The filter residue is milled with the thus-treated product with the addition of 190 g of maltodextrin. The powdered synthetic flavourant obtained has a flavour of glazed ham. By the addition of a smoke flavourant this can be modified in a desirable manner.

EXAMPLE 8

An intimate mixture of:

| | |
|---|---|
| 1-Maltosylamine | 16 g |
| Ascorbic acid | 4 g |
| Cysteine hydrochloride | 2 g |
| Cysteamine | 1 g |
| Methional | 0.5 g |
| Water | 5 g |
| Propylene/glycol | 15 g | is heated to 120° C. for 15 minutes. The resulting yellow-brown product has a pronounced flavour of dried dates.

EXAMPLE 9

An intimate mixture of:

| | |
|---|---|
| 1-Xylosyl-pyrrolidine | 75 g |
| Cysteine hydrochloride | 30 g |
| Water | 20 g |
| Propylene/glycol | 150 g | is heated to 120° C. for 5 minutes. The product has a pleasant animal-like roast meat character.

EXAMPLE 10

An intimate mixture of:

| | |
|---|---|
| 1-Glucosyl-piperidine | 6 g |
| Proline | 3 g |
| Water | 1 g |
| propylene/glycol | 1.5 g | is heated to 120° C. for 5 minutes. The dark brown product has a pronounced flavour of house-baked butter cookies (dosage e.g. 0.1%).

EXAMPLE 11

An intimate mixture of:

| | |
|---|---|
| 1-Glucosyl-piperidine | 6 g |
| Methionine | 0.5 g |
| Cysteine | 3 g |
| Water | 1 g |
| propylene/glycol | 2 g | is heated to 120° C. for 5 minutes. The resulting yellow liquid, used in a bouillon in an amount of 0.2%, gives a delicious chicken bouillon having a typical fatty-meaty chicken flavour.

What is claimed is:

1. A process for the manufacture of synthetic flavorants, which process comprises heating at a temperature within the range from about 50° C. to about 180° C. for a time sufficient for reaction up to about 2 hours, a mixture containing about 0.5 wt.% to about 75 wt.% of an amino sugar in which the alcoholic group in the 1- or 2- position has been replaced by an amino group; about 1.5% to 45% of an amino acid, or a pyrolytic degration product thereof; and about 0.5% and 95% of a polyalcohol and/or water.

2. A process according to claim 1, wherein a 1- or a 2-aminopentose or -hexose is used as the amino sugar.

3. A process according to claim 1, wherein at least one member selected from the group consisting of cysteine, methionine and glycine is used as the amino acid.

4. A process according to claim 1, wherein glycerine or propylene glycol is used as the polyalcohol.

5. A process according to claim 1, wherein the mixture contains water.

6. A process according to claim 1, wherein the mixture also contains at least one member of the group consisting of animal oil, vegetable oil and fats.

7. A process according to claim 1, wherein the heating is carried out in the presence of a sulphur-containing compound.

8. A process according to claim 7, wherein sodium sulphide, 2-mercaptoethanol, cysteamine, furfurylmercaptan or thioacetic acid is used as the sulphur-containing compound.

9. A process according to claim 1, wherein the mixture is heated to a temperature of 110° C. to 150° C.

* * * * *